(12) United States Patent
Kim et al.

(10) Patent No.: US 9,770,013 B2
(45) Date of Patent: Sep. 26, 2017

(54) DISPLAY DEVICE FOR PETS

(71) Applicants: NEO POP, Incheon (KR); Young-Jin Seo, Incheon (KR)

(72) Inventors: Min-Ji Kim, Incheon (KR); Young-Jin Seo, Incheon (KR)

(73) Assignee: NEO POP LTD., Incheon (KR)

( * ) Notice: Subject to any disclaimer, the term of this patent is extended or adjusted under 35 U.S.C. 154(b) by 0 days.

(21) Appl. No.: 14/888,635

(22) PCT Filed: May 7, 2015

(86) PCT No.: PCT/KR2015/004544
§ 371 (c)(1),
(2) Date: Nov. 2, 2015

(87) PCT Pub. No.: WO2015/170888
PCT Pub. Date: Nov. 12, 2015

(65) Prior Publication Data
US 2017/0042125 A1    Feb. 16, 2017

(51) Int. Cl.
*G08B 23/00* (2006.01)
*A01K 27/00* (2006.01)
(Continued)

(52) U.S. Cl.
CPC ............ *A01K 27/009* (2013.01); *A01K 11/00* (2013.01); *A01K 11/008* (2013.01);
(Continued)

(58) Field of Classification Search
CPC .... A01K 27/009; A01K 11/08; A01K 15/023; A01K 27/006; A01K 29/005; A01K 11/008
(Continued)

(56) References Cited

U.S. PATENT DOCUMENTS

| 2012/0252486 A1* | 10/2012 | Lopez | A01K 15/021 |
| | | | 455/456.1 |
| 2013/0014706 A1* | 1/2013 | Menkes | A61D 13/00 |
| | | | 119/859 |

FOREIGN PATENT DOCUMENTS

| KR | 1020010044832 A | * | 6/2001 | ............ G01S 5/02 |
| KR | 2003487240000 | | 4/2004 | |

* cited by examiner

*Primary Examiner* — John A Tweel, Jr.
(74) *Attorney, Agent, or Firm* — IPLA P.A.; James E. Bame

(57) ABSTRACT

A display device for pets joined to a collar or the like of a pet to provide various information without being interrupted by movement of the pet include a housing member in which a space for installing a plurality of electronic components is formed, the housing member having a certain length in one direction, a display unit installed in the housing member to display various information, a switch module configured to turn on/off power of the display unit and change the information displayed on the display unit, a power module configured to perform charging using power from the outside, and supply power to the plurality of electronic components installed in the housing member, a sensor module including at least one sensor for measuring a condition of a pet, an animal information management module configured to store and manage information on the pet wearing the display device for pets, a satellite navigation receiver module configured to communicate with a navigation satellite at regular intervals to receive coordinate data on a location, and a communication module configured to transmit/receive the information displayed on the display unit while communicating with the outside.

19 Claims, 6 Drawing Sheets

(51) Int. Cl.
*A01K 11/00* (2006.01)
*A01K 15/02* (2006.01)
*A01K 29/00* (2006.01)

(52) U.S. Cl.
CPC .......... *A01K 15/023* (2013.01); *A01K 27/006* (2013.01); *A01K 29/005* (2013.01)

(58) Field of Classification Search
USPC ...................................................... 340/573.3
See application file for complete search history.

DISPLAY DEVICE FOR PETS

BACKGROUND

The present invention relates to a display device for pets, and more particularly, to a display device for pets capable of providing various information on pets without being interrupted by movement of the pets.

As the number of family members decreases, more and more people live together with pets to avoid the monotony of everyday life, and the types of pets also increase. However, as the number of families living together with pets increases, the number of pets lost due to carelessness also increases rapidly.

Since lost pets often become wild and hurt people or become carriers of diseases, the social costs of treating lost pets increase. In some cases, to protect and prevent pets from being lost, identification tags on which pets' names or owners' contact numbers are recorded are attached to the pets, but such tags do not provide a sufficient space for displaying various information. For another example, an RFID tag is implanted into a body of a pet. However, a third person other than an owner may not recognize the existence of the RFID tag.

Korean Utility Model Registration No. 20-0348724 (entitled "Animal Monitoring Apparatus Having Location Checking Function", registered on Apr. 13, 2004, hereinafter referred to as a prior art) is directed to preventing pets from being lost. However, since the device of the prior art is configured to be secured to a collar or the like of a pet, it is difficult to use the device of the prior art for small pets.

SUMMARY OF THE INVENTION

An object of the present invention is to provide a display device for pets which is joined to a collar or the like of a pet to provide various information without being interrupted by movement of the pet.

Another object of the present invention is to provide a display device for pets which registers mating information on a pet to correctly find a mate while communicating with another display device for pets.

Another object of the present invention is to provide a display device for pets for preventing a pet from being lost by warning an owner when being spaced apart from a smartphone of the owner by a certain distance while communicating with the smartphone.

Another object of the present invention is to provide a display device for pets for enabling an owner to check psychological conditions of a pet by checking and displaying the psychological conditions of the pet.

In one embodiment, a display device for pets includes: a housing member in which a space for installing a plurality of electronic components is formed, the housing member having a certain length in one direction; a display unit installed in the housing member to display various information; a switch module configured to turn on/off power of the display unit and change the information displayed on the display unit; a power module configured to perform charging using power from the outside, and supply power to the plurality of electronic components installed in the housing member; a sensor module including at least one sensor for measuring a condition of a pet; an animal information management module configured to store and manage information on the pet wearing the display device for pets; a satellite navigation receiver module configured to communicate with a navigation satellite at regular intervals to receive coordinate data on a location; and a communication module configured to transmit/receive the information displayed on the display unit while communicating with the outside.

Preferably, a joining part may be provided to both ends of the housing member, wherein one side of the joining part may be formed as a USB connector able to be electrically connected to an external device.

Preferably, the switch module may include: a switch unit configured to control operation of the display unit when being pressed by a user by recognizing a screen touch on the display unit or being installed in an outer surface of the housing member; a display unit operating unit configured to turn on/off the power of the display unit; a screen brightness adjusting unit configured to adjust screen brightness of the display unit; and a display information adjusting unit configured to control switching of the information displayed on the display unit so that the information is switched quickly or slowly.

Preferably, the power module may include: a battery supplied with power from the outside so as to be charged and supply power; a power connection unit disposed at one side of the housing member, electrically connected to the battery, and transferring the power supplied from the outside to the battery so that the battery is charged; and a power display unit configured to display a charging state of the battery on one side of the display unit.

Preferably, the battery may be charged through the USB connector used as the joining part, or may be charged with power supplied through the power connection unit.

Preferably, the animal information management module may include: an animal information registration unit configured to register and store unique identification information of the display device for pets and information on an animal; a sensing information management unit configured to store information on the condition of the pet measured by the sensor module; an animal group display unit configured to differentially display a color of a part or the entirety of a display screen according to the type of a registered pet.

Preferably, the display device for pets may further include a mating management module configured to register mating information and check and display a corresponding mating partner while communicating with another display device for pets.

Preferably, the mating management module may include: a mating registration unit configured to register information on mating; a mating communication unit configured to check information on a mate to be found while communicating with another display device for pets or a smartphone via the communication module; and a mating display unit configured to display, on the display unit, information on a suitable mating partner using a text or color when the information on the suitable mating partner is checked by the mating communication unit.

Preferably, the display device for pets may further include a loss prevention module configured to communicate with a smartphone of an owner to output warning information when the smartphone is spaced apart by at least a certain distance.

Preferably, the loss prevention module may include: an owner detection communication unit configured to detect the registered smartphone of the owner within a certain distance through short-range communication; a loss warning unit configured to output a pre-recorded loss prevention warning sound or output a warning message to the display unit when the smartphone of the owner is not recognized by the owner detection communication unit; and a final location transmitting unit configured to provide, to the smartphone of the owner, operation information of the loss warning unit and information on a finally detected location.

Preferably, the display device for pets may further include a collision warning module configured to output a warning sound when a speed sensor detects an object approaching at a certain speed or higher within a certain distance.

Preferably, the collision warning module may include: a moving object checking unit mounted on the housing member to check the object approaching within the certain distance and a speed of the object; and a collision warning unit configured to output the warning sound when the moving object checking unit detects the object having the speed.

Preferably, the display device for pets may further include an animal psychology checking module configured to compare sensed information of an animal with pre-registered information to display psychological conditions of the pet on the display unit.

Preferably, the animal psychology checking module may include: a psychological information storage unit configured to store information corresponding to the psychological conditions of the pet; a psychological condition detection unit configured to detect a heart rate, movement, and a barking sound of the pet measured by the sensor module; a psychological condition determination unit configured to compare information detected by the psychological condition detection unit with pre-registered information to determine corresponding psychological information; a psychological condition display unit configured to display the psychological information determined by the psychological condition determination unit; and a psychological condition providing unit configured to provide the psychological conditions of the pet to a smartphone of an owner.

Preferably, the display device for pets may further include a facility management module configured to register information on facilities used for the pet and communicate with the facilities to transmit/receive various information thereto/therefrom.

Preferably, the facility management module may include: a facility registration unit configured to store information on the facilities used for the pet; a facility information display unit configured to display, on the display unit, information received from the facilities; and an update transmitting unit configured to transmit update information on the pet.

Preferably, the display device for pets may further include a lead member having one side coupled to the housing member and another side in which a handlebar is formed so that a user holds the handlebar.

According to the present invention, a display device for pets is coupled to a collar or the like of a pet not to interrupt movement of the pet, and various information may be provided to a user or a third person.

Furthermore, various information displayed on a display unit may be changed by simply manipulating a switch unit, so that the user may easily use the display device for pets.

Furthermore, the display device for pets may communicate with another display device for pets so that mates may be mutually and correctly found.

Moreover, since the display device for pets warns an owner when being spaced apart from a smartphone of the owner by a certain distance while communicating with the smartphone, the display device for pets may be prevented from being lost.

In addition, since psychological conditions of a pet are checked and displayed, the owner may appropriately act according to the psychological conditions of the pet.

DETAILED DESCRIPTION OF THE INVENTION

Preferred embodiments of the present invention will be described in detail with reference to the accompanying drawings.

Figure 2:
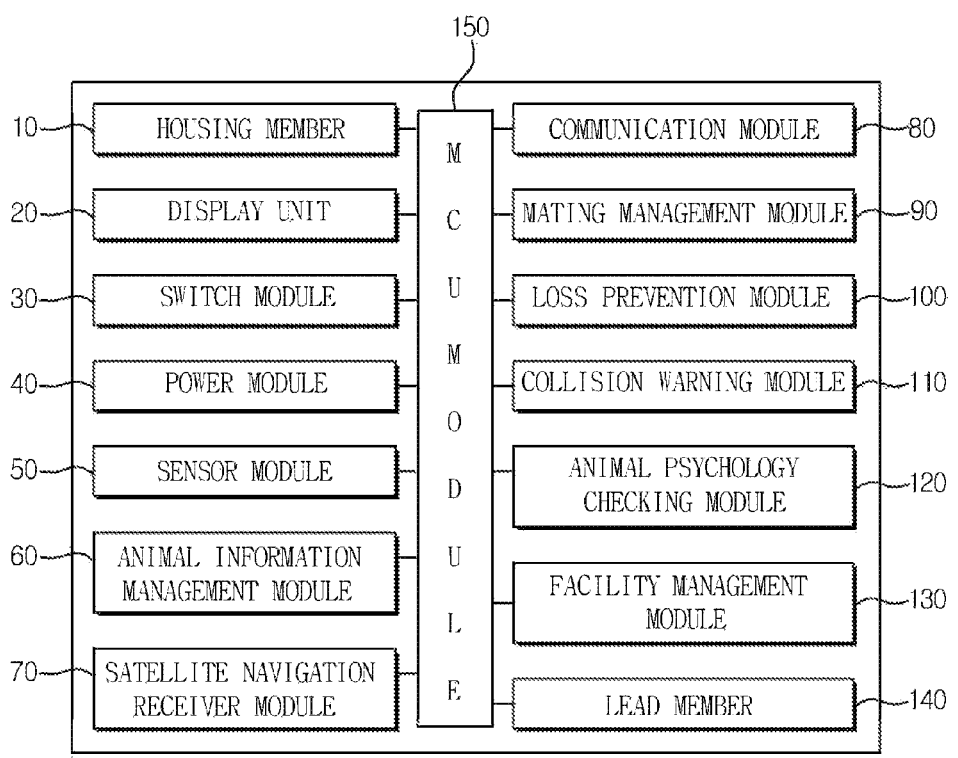
FIG. 2 is a block diagram illustrating the display device for pets according to the present invention.

As illustrated in FIG. 2, a display device for pets according to the present invention includes a housing member 10, a display unit 20, a switch module 30, a power module 40, a sensor module 50, an animal information management module 60, a satellite navigation receiver module 70, a communication module 80, a mating management module 90, a loss prevention module 100, a collision warning module 110, an animal psychology checking module 120, a facility management module 130, and an MCU module 150.

Figure 1:
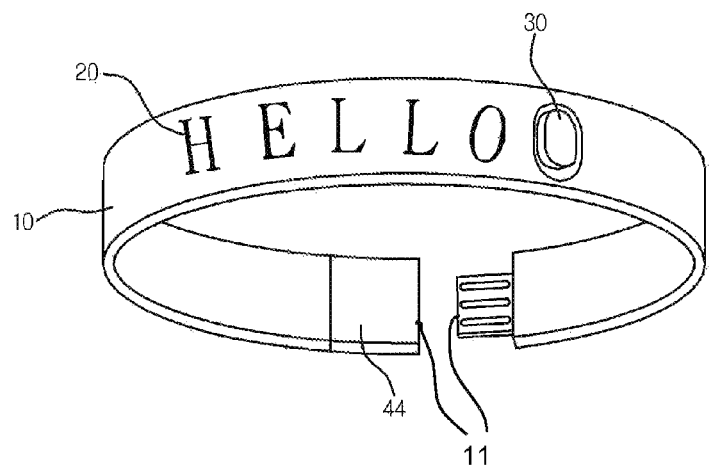
FIG. 1 is a diagram exemplarily illustrating a display device for pets according to the present invention.

The housing member 10 has a space in which a plurality of electronic components may be installed, and has a predetermined length in one direction. As illustrated in FIG. 1, the housing member 10 is shaped like a rectangle that is annularly curved and has a predetermined length for surrounding a neck of a pet. The housing member 10 is preferably made of a material such as plastic, silicone, rubber, or the like so as to be bent with ease.

A joining part 11 is provided to both ends of the housing member 10. The joining part 11 engages and couples the both ends of the housing member 10. One side of the joining part 11 may be formed as a USB connector 44 able to be electrically connected to an external device, and the other side of the joining part 11 is preferably formed in such a shape that the USB connector 44 may be inserted thereinto. The USB connector 44 may be connected to an external device so as to be supplied with power or may control the display device for pets, while being used as the joining part 11 for the housing member 10.

A QR code for identifying an animal may be additionally printed on an outer surface of the housing member 10. By virtue of the QR code, information on a pet may be checked using an external device capable of recognizing the QR code.

The display unit 20 is installed in the housing member 10 to display various information. The display unit 20 may be installed in the outer surface of the housing member 10, or may be installed, as necessary, inside the housing member 10 so that information displayed on the display unit 20 may be transmitted through the housing member 10 so as to be shown to the outside. Here, the display unit includes a light-emitting diode (LED), an organic light-emitting diode (OLED), or the like. The display unit 20 displays a contact number of a user such as a telephone number, an animal's name, an animal's type, and animal identification information (e.g., a barcode, a QR code, or the like) such that the foregoing pieces of information are repeatedly and alternately displayed or are displayed while being moved in one direction.

Figure 3:
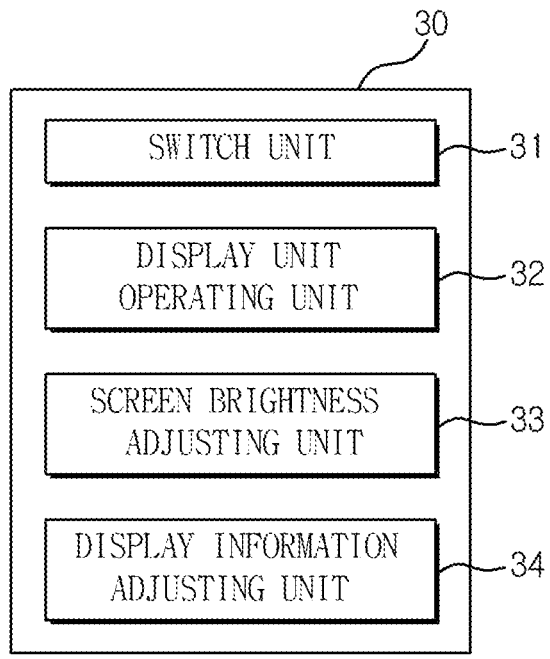
FIG. 3 is a block diagram illustrating a switch module according to the present invention.

The switch module 30 may turn on/off power of the display unit 20, and changes information displayed on the display unit 20. As illustrated in FIG. 3, the switch module 30 includes a switch unit 31, a display unit operating unit 32, a screen brightness adjusting unit 33, and a display information adjusting unit 34. Here, in the case where a screen of the display unit 20 is a touch screen, the switch module 30 enables the user to touch the screen to perform control.

The switch unit 31 may be installed in the outer surface of the housing member so as to be pressed by the user, or the switch unit 31 may be pressed by the user by touching the screen of the display unit 20. Once the switch unit 31 is pressed, the switch unit 31 controls operation of the display unit 20.

The display unit operating unit 32 controls the power of the display unit 32 so that the power of the display unit 20 is turned on/off. Once the switch unit 31 is pressed while the display unit 20 is turned off, the display unit operating unit 20 supplies power to the display unit 20 to turn on the display unit 20. Then, once the switch unit 31 is pressed one time or a certain period of time elapses while the display unit 20 is turned on, the display unit operating unit turns off the display unit 20. Here, when the display unit 20 is turned on, various information is displayed thereon.

If the switch unit 31 is pressed for a certain time or longer (e.g., about two seconds or longer), the screen brightness adjusting unit 33 enables adjustment of screen brightness of the display unit 20. For example, if the switch unit 31 is long-pressed for at least two seconds, adjustment of screen brightness is enabled, and, if the switch unit 31 is pressed consecutively, the brightness of the display unit 20 is increased or decreased.

If the user short-presses the switch unit 31 two times (i.e., double-clicks) for a certain period of time while the display unit 20 is turned on, the display information adjusting unit 34 performs control so that various information displayed on the display unit 20 is switched quickly or slowly.

Figure 4:
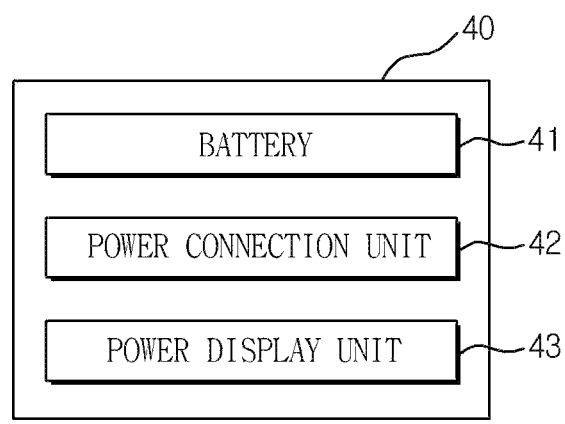
FIG. 4 is a block diagram illustrating a power module according to the present invention.

The power module 40 performs charging with power from the outside, and supplies power to a plurality of electronic components installed in the housing member 10. As illustrated in FIG. 4, the power module 40 includes a battery 41, a power connection unit 42, and a power display unit 43.

The battery 41 is disposed in the housing, is charged with power from the outside, and supplies power to electronic components such as the display unit 20. The battery 41 may be charged through the USB connector 44 used as the joining part 11, or may receive power supplied through the power connection unit 42 so as to be charged.

The power connection unit 42 is disposed at one side of the housing, is electrically connected to the battery 41, and transfers power supplied from the outside to the battery 41 so that the battery 41 is charged. In one embodiment of the present invention, the power connection unit 42 may be a micro-USB connector 44, or may be another type of an interface such as a smartphone charger.

The power display unit 43 displays a charging state of the battery 41 on one side of the display unit 20. The power display unit 43 presents a remaining capacity of the battery 41 using an image or number, and it is preferable that the power of the display unit 20 be turned on so that the remaining capacity may be checked from the outside if the remaining capacity is equal to or lower than a reference value. For example, when the remaining capacity of the battery 41 is lower than about 5%, the power display unit 41 operates the display unit 20 to display a message of "charging is required".

The sensor module 50 includes at least one sensor for measuring a health condition of a pet. The health condition may include blood glucose, temperature, heart rate, or the like. The blood glucose is measured by a sensor without using an invasive method (blood collection through a needle), the temperature is measured by a temperature sensor, the heart rate is measured by a pulse sensor, and a speed of an approaching object is measured by a speed sensor.

Figure 5:
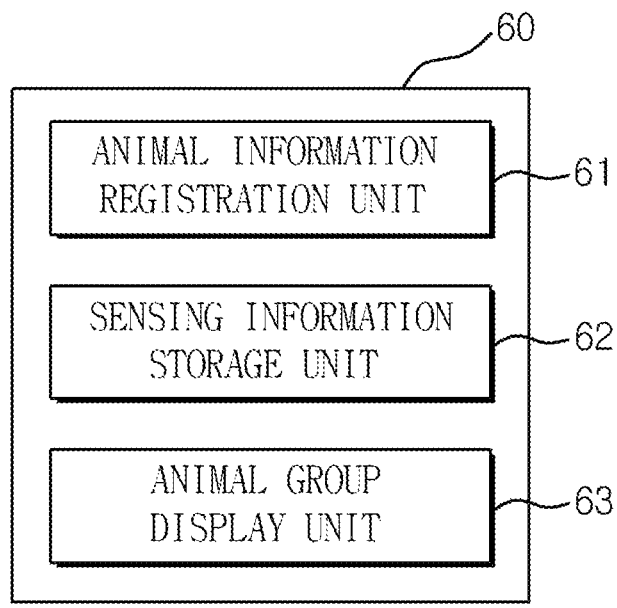
FIG. 5 is a block diagram illustrating an animal information management module according to the present invention.

The animal information management module 60 stores and manages information on a pet wearing the display device for pets. As illustrated in FIG. 5, the animal information management module 60 includes an animal information registration unit 61, a sensing information storage unit 62, and an animal group display unit 63.

The animal information registration unit 61 registers and stores unique identification information of the display device for pets and information on a pet. The information on a pet includes an owner's name, an animal's name, an animal's type, animal identification information (e.g., a barcode, a QR code, or the like), or the like. Each display device for pets may be distinguished using such unique identification information. The animal information registration unit 61 may be installed in the housing member as an RFID chip (not shown) in which various information is stored.

The sensing information storage unit 62 stores information on the conditions of a pet measured by the sensor module 50. The stored information may be displayed via the display unit 20, or may be transferred to the outside via the communication module 80.

The animal group display unit 63 differentiates a color of a part or the entirety of a display screen according to the type of a registered pet. For example, in the case where the pet is a poodle, the entirety or a specific portion of the display screen may be displayed in blue color.

The satellite navigation receiver module 70 communicates with a navigation satellite at regular intervals to receive coordinate data on a location. The received coordinate data is transferred to the animal group display unit 63, and is used for location tracking or the like. It is preferable that information of the satellite navigation receiver module 70 be provided to a smartphone of an owner of a pet.

The communication module 80 transmits/receives information displayed on the display unit 20 or information stored in the animal group display unit 63, while communicating with the outside. The communication module 80 includes a wireless/wired communication means including Bluetooth, beacon, or the like.

Figure 6:
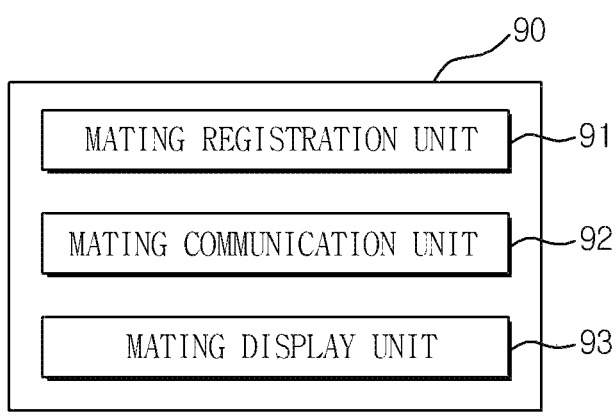
FIG. 6 is a block diagram illustrating a mating management module according to the present invention.

Once mating information is registered, the mating management module 90 checks and displays a corresponding mating partner while communicating with another display device for pets. As illustrated in FIG. 6, the mating management module 90 includes a mating registration unit 91, a mating communication unit 92, and a mating display unit 93.

In the case where mating of a pet is desired, the mating registration unit 91 registers information on mating. Here, a plurality of breeds may be selected to register the information on mating, and it is preferable that the information on mating include a mating period.

The mating communication unit 92 communicates with another display device for pets or a smartphone via the communication module 80 to check information on a mate to be found. Here, the mating communication unit 92 uses a short-range communication technology such as beacon so that mating information may be checked when another display device or a smartphone approaches within a certain distance.

When information on a pet suitable for mating is confirmed in the mating communication unit 92, the mating display unit 93 displays the information on the display unit 20 using a text or color. Here, it is preferable that each display device for pets use the same color to display the screen of the display unit 20 if mates are mutually confirmed.

By virtue of the mating management module 90, even when the user walks a pet on a street, a mate may be detected with ease if another display device for pets approaches within a certain distance.

Figure 7:
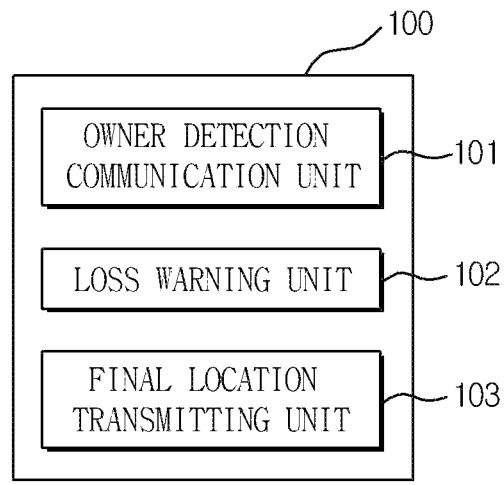
FIG. 7 is a block diagram illustrating a loss prevention module according to the present invention.

The loss prevention module 100 communicates with a smartphone of the owner to output a warning message or warning information when being spaced apart from the smartphone by a certain distance or more. As illustrated in FIG. 7, the loss prevention module 100 includes an owner detection communication unit 101, a loss warning unit 102, and a final location transmitting unit 103. The loss prevention module 100 may be operated by a switch additionally installed in the housing member, or may be operated by a menu provided on a touch screen of the display unit 20, or may be operated by the smartphone of the user.

The owner detection communication unit 101 detects the smartphone of the owner within a certain distance therefrom through short-range communication.

When the smartphone of the owner is not recognized by the owner detection communication unit 101, the loss prevention module 102 outputs a pre-recorded loss prevention warning sound or outputs a warning message to the display unit 20. Here, the loss prevention warning sound may contain a voice of asking for help such "I'm lost!, Please contact phone ★★★-★★★★-★★★★" or "Stop", or this message may be displayed on the display unit 20.

The final location transmitting unit 103 provides, to the smartphone of the owner, operation information of the loss warning unit 102 and information on a finally detected location.

When a pet is away from the owner by a certain distance, the pet may stay at its position or may receive help from another person by virtue of the loss prevention module 100 so that the pet may be prevented from being lost.

Figure 8:
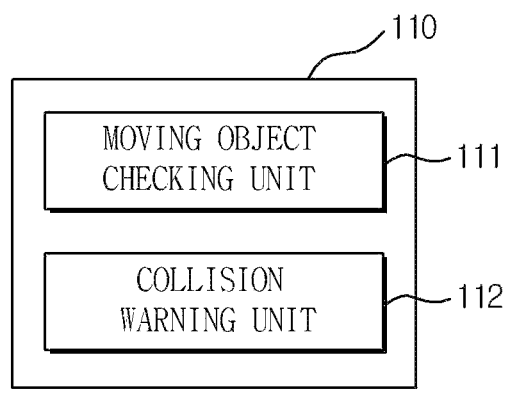
FIG. 8 is a block diagram illustrating a collision warning module according to the present invention.

The collision warning module 110 outputs a warning sound when an object that approaches at a certain speed or higher within a certain distance is detected by the speed sensor. As illustrated in FIG. 8, the collision warning module 110 includes a moving object checking unit 111 and a collision warning unit 112. The collision warning module 110 may be operated by a menu provided through the touch screen of the display unit 20 or may be operated by the smartphone of the user.

The moving object checking unit 111 is mounted on the housing member to determine whether a moving object such as a bicycle, a vehicle, a person, or the like approaches within a certain distance and determine a speed of the object.

When an object having a speed is detected by the moving object checking unit 111, the collision warning unit 112 outputs a warning sound. Here, a recorded voice of the owner, such as "stop", may be used as the warning sound.

Figure 9:
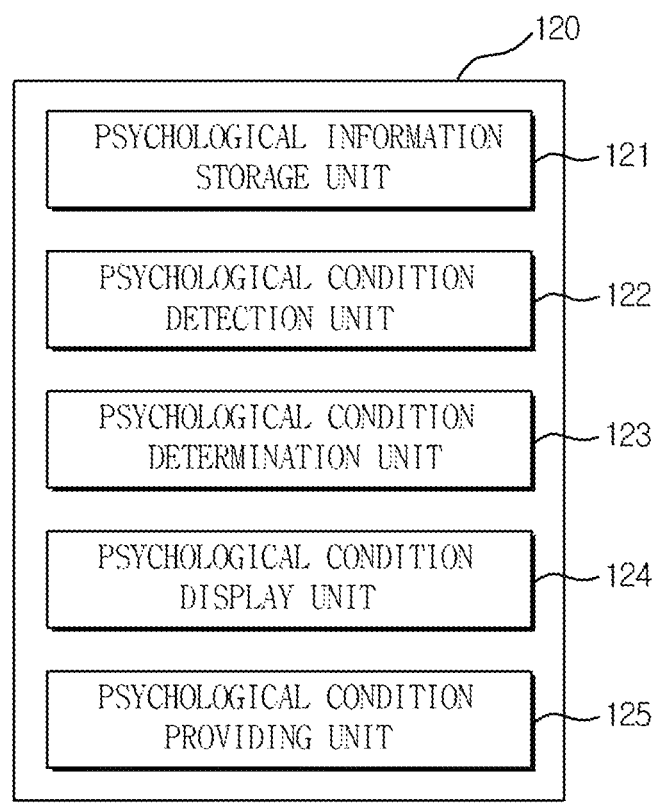
FIG. 9 is a block diagram illustrating an animal psychology checking module according to the present invention.

The animal psychology checking module 120 compares a sensed heart rate, movement, or barking sound of a pet with pre-registered information to display, on the display unit 20, light, a text, or the like corresponding to a psychological condition of the pet. As illustrated in FIG. 9, the animal psychology checking module 120 includes a psychological information storage unit 121, a psychological condition detection unit 122, a psychological condition determination unit 123, a psychological condition display unit, and a psychological condition providing unit 125. The animal psychology checking module 120 may be operated by a menu provided through the touch screen of the display unit 20 or may be operated by the smartphone of the user.

The psychology information storage unit 121 stores information corresponding to psychological conditions of a pet, such as a heart rate, a movement, a barking sound, or the like. The psychological conditions of a pet are classified into a good mood, a bad mood, a sadness, or the like so as to be stored according to the heart rate, the movement, or the barking sound.

The psychological condition detection unit 122 detects the heart rate, movement, or barking sound of a pet measured by the sensor module 50.

The psychological condition determination unit 123 compares the information detected by the psychological condition detection unit 122 with pre-registered information to determine corresponding psychological information.

The psychological condition display unit 124 displays, on the display unit 20, the psychological information determined by the psychological condition determination unit 123. The psychological condition display unit 124 displays, on the display unit 20, the psychological information using a text or color according to the psychological condition of a pet.

The psychological condition providing unit 125 provides, to the smartphone of the owner, the psychological condition of a pet.

By virtue of the animal psychology checking module 120, the owner may frequently check a condition of a pet.

Figure 10:
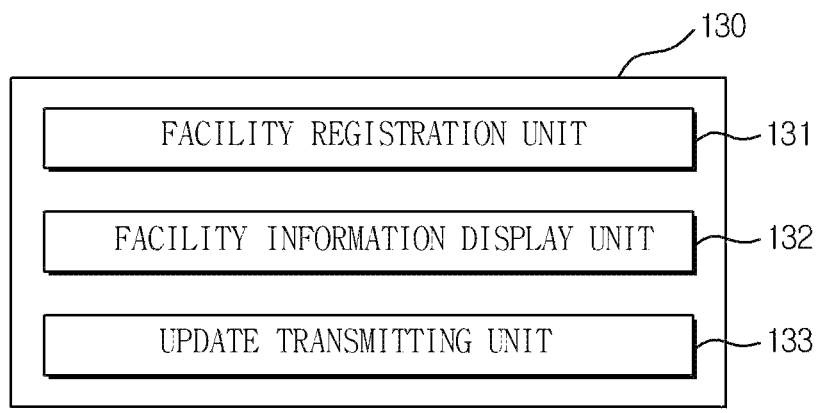
FIG. 10 is a block diagram illustrating a facility management module according to the present invention.
Figure 11:
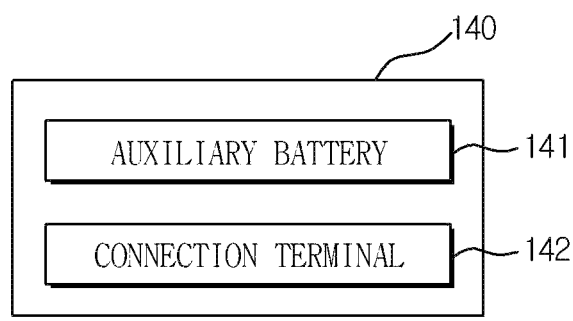
FIG. 11 is a block diagram illustrating a lead module according to the present invention.

The facility management module 130 registers and stores information on facilities for pets, such as animal hospitals, hotels, shops, or the like, and transmits/receives various information to/from the facilities while communicating therewith. As illustrated in FIG. 10, the facility management module 130 includes a facility registration unit 131, a facility information display unit 132, and an update transmitting unit 133.

The facility registration unit 131 stores information on facilities used for pets. The information on facilities includes a contact number, a server for transferring various information, or the like.

The facility information display unit 132 displays, on the display unit 20, information received from a facility. For example, in the case where the facility is an animal hospital, information such as a date of vaccination, an examination schedule, or the like may be checked as the facility information.

The update transmitting unit 133 transmits update information on a pet. The update information includes a phone number and an address of the owner of the pet and various information measured by the sensor module 50.

By virtue of the facility management module 130, information required for a pet may be received by the display device for pets in real time, and changed information may be provided to the display device for pets so that information thereof may be updated.

The display device according to the present invention may further include a lead member 140 including a string having at least a certain length. One side of the lead member 140 is coupled to the housing member 10, and a handlebar may be formed at the other side of the lead member 140 so that the user may lead a pet when the display device for pets is coupled to a collar of the pet.

The handlebar of the lead member 140 is provided with an auxiliary battery 141 for supplying power to a power supply unit. Furthermore, a cord electrically connected to the auxiliary battery 141 is disposed in the lead member 140, and an end of the cord is provided with a connection terminal 142 for being electrically connected to the power connection unit 42.

Therefore, when the user walks a pet to which the display device for pets is coupled, the user may lead the pet by coupling the lead member 140 to the housing member. Here, power of the auxiliary battery 141 of the handlebar may be supplied to the power module via the connection terminal and the power connection unit 42 so that the battery 41 may be charged.

The MCU module 150 controls functions of each member and each module.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device for pets, comprising:
    a housing member in which a space for installing a plurality of electronic components is formed, the housing member having a certain length in one direction;
    a display unit installed in the housing member to display various information;
    a switch module configured to turn on/off power of the display unit and change the information displayed on the display unit;
    a power module configured to perform charging using power from the outside, and supply power to the plurality of electronic components installed in the housing member;
    a sensor module comprising at least one sensor for measuring a condition of a pet;
    an animal information management module configured to store and manage information on the pet wearing the display device for pets;
    a satellite navigation receiver module configured to communicate with a navigation satellite at regular intervals to receive coordinate data on a location;
    a communication module configured to transmit/receive the information displayed on the display unit or information stored in an animal group display unit while communicating with the outside, and
    a collision warning module configured to output a warning sound when a speed sensor detects an object approaching at a certain speed or higher within a certain distance.

2. The display device for pets according to claim 1, wherein a joining part is provided to both ends of the housing member, wherein one side of the joining part is formed as a USB connector able to be electrically connected to an external device.

3. The display device for pets according to claim 1, wherein the switch module comprises:
    a switch unit configured to control operation of the display unit when being pressed by a user by recognizing a screen touch on the display unit or being installed in an outer surface of the housing member;
    a display unit operating unit configured to turn on/off the power of the display unit;
    a screen brightness adjusting unit configured to adjust screen brightness of the display unit; and
    a display information adjusting unit configured to control switching of the information displayed on the display unit so that the information is switched quickly or slowly.

4. The display device for pets according to claim 1, wherein the power module comprises:
    a battery supplied with power from the outside so as to be charged and supply power;
    a power connection unit disposed at one side of the housing member, electrically connected to the battery, and transferring the power supplied from the outside to the battery so that the battery is charged; and
    a power display unit configured to display a charging state of the battery on one side of the display unit.

5. The display device for pets according to claim 1, wherein the animal information management module comprises:
    an animal information registration unit configured to register and store unique identification information of the display device for pets and information on an animal;
    a sensing information management unit configured to store information on the condition of the pet measured by the sensor module; and
    an animal group display unit configured to differentially display a color of a part or the entirety of a display screen according to the type of a registered pet.

6. The display device for pets according to claim 1, further comprising a mating management module configured to register mating information and check and display a corresponding mating partner while communicating with another display device for pets.

7. The display device for pets according to claim 6, wherein the mating management module comprises:
    a mating registration unit configured to register information on mating;
    a mating communication unit configured to check information on a mate to be found while communicating with another display device for pets or a smartphone via the communication module; and
    a mating display unit configured to display, on the display unit, information on a suitable mating partner using a text or color when the information on the suitable mating partner is checked by the mating communication unit.

8. The display device for pets according to claim 6, wherein a plurality of breeds are selected to be registered as the mating information, and the mating information additionally comprises a mating period.

9. The display device for pets according to claim 1, further comprising a loss prevention module configured to communicate with a smartphone of an owner to output warning information when the smartphone is spaced apart by at least a certain distance.

10. The display device for pets according to claim 9, wherein the loss prevention module comprises:
an owner detection communication unit configured to detect the registered smartphone of the owner within a certain distance through short-range communication; and
a loss warning unit configured to output a pre-recorded loss prevention warning sound or output a warning message to the display unit when the smartphone of the owner is not recognized by the owner detection communication unit.

11. The display device for pets according to claim 9, wherein the loss prevention module further comprises a final location transmitting unit configured to provide, to the smartphone of the owner, operation information of the loss warning unit and information on a finally detected location.

12. The display device for pets according to claim 1, wherein the collision warning module comprises:
a moving object checking unit mounted on the housing member to check the object approaching within the certain distance and a speed of the object; and
a collision warning unit configured to output the warning sound when the moving object checking unit detects the object having the speed.

13. The display device for pets according to claim 1, further comprising an animal psychology checking module configured to compare sensed information of an animal with pre-registered information to display psychological conditions of the pet on the display unit.

14. The display device for pets according to claim 13, wherein the psychological conditions of the pet are classified into a good mood, a bad mood, and a sadness according to a heart rate, movement, and a barking sound so as to be stored.

15. The display device for pets according to claim 13, wherein the animal psychology checking module comprises:
a psychological information storage unit configured to store information corresponding to the psychological conditions of the pet;
a psychological condition detection unit configured to detect a heart rate, movement, and a barking sound of the pet measured by the sensor module;
a psychological condition determination unit configured to compare information detected by the psychological condition detection unit with pre-registered information to determine corresponding psychological information; and
a psychological condition display unit configured to display the psychological information determined by the psychological condition determination unit.

16. The display device for pets according to claim 15, wherein the animal psychology checking module further comprises a psychological condition providing unit configured to provide the psychological conditions of the pet to a smartphone of an owner.

17. The display device for pets according to claim 1, further comprising a facility management module configured to register information on facilities used for the pet and communicate with the facilities to transmit/receive various information thereto/therefrom.

18. The display device for pets according to claim 17, wherein the facility management module comprises:
a facility registration unit configured to store information on the facilities used for the pet;
a facility information display unit configured to display, on the display unit, information received from the facilities; and
an update transmitting unit configured to transmit update information on the pet.

19. The display device for pets according to claim 1, further comprising a lead member having one side coupled to the housing member and another side in which a handlebar is formed so that a user holds the handlebar, wherein the handlebar of the lead member is provided with an auxiliary battery for supplying power to a power supply unit.

* * * * *